March 11, 1969  A. J. GIRARD  3,432,238
SPECTROMETRIC APPARATUS OF HIGH RESOLVING POWER
Filed March 4, 1965  Sheet 1 of 3

ANDRÉ JEAN GIRARD
INVENTOR.

BY Karl F. Ross
AGENT

Fig.5
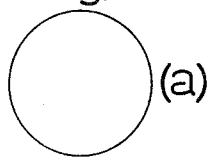 (a)
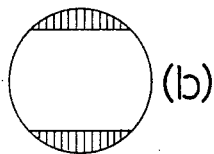 (b)
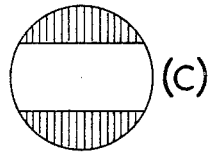 (c)
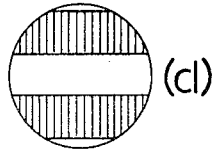 (d)
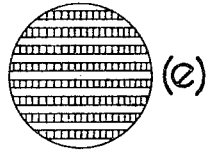 (e)
Fig.6
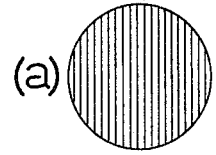 (a)
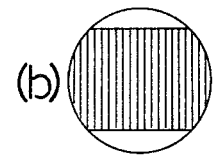 (b)
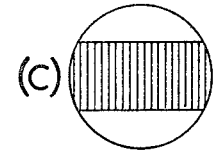 (c)
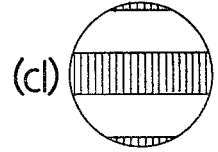 (d)
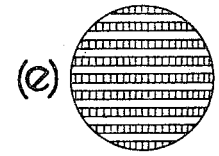 (e)
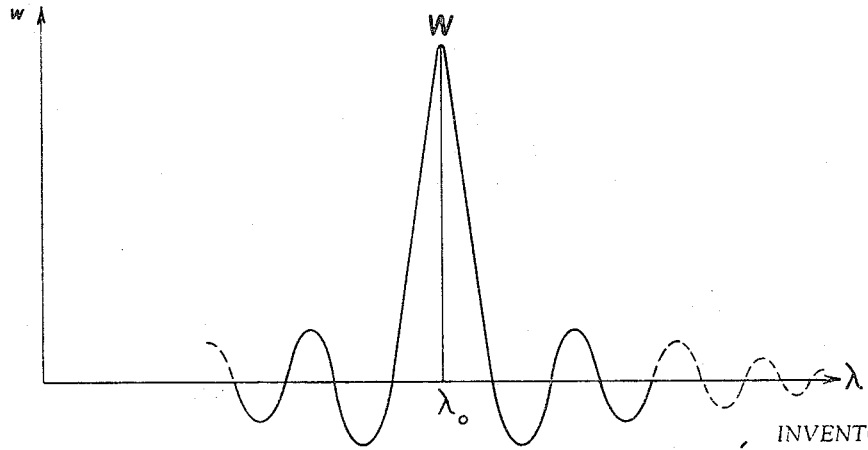
Fig.7
INVENTOR:
ANDRÉ JEAN GIRARD
BY
Karl F. Ross
AGENT March 11, 1969  A. J. GIRARD  3,432,238
SPECTROMETRIC APPARATUS OF HIGH RESOLVING POWER
Filed March 4, 1965  Sheet 3 of 3
Fig. 8
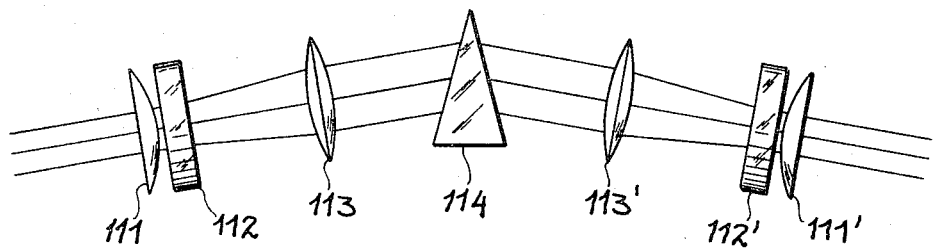
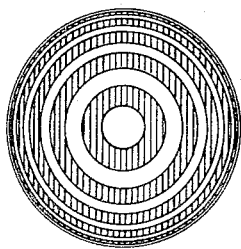
Fig. 10
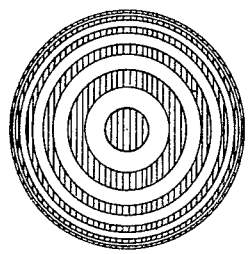
Fig. 11
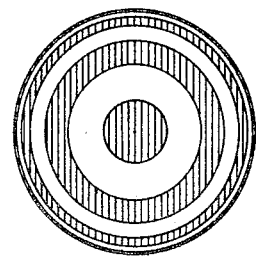
Fig. 13
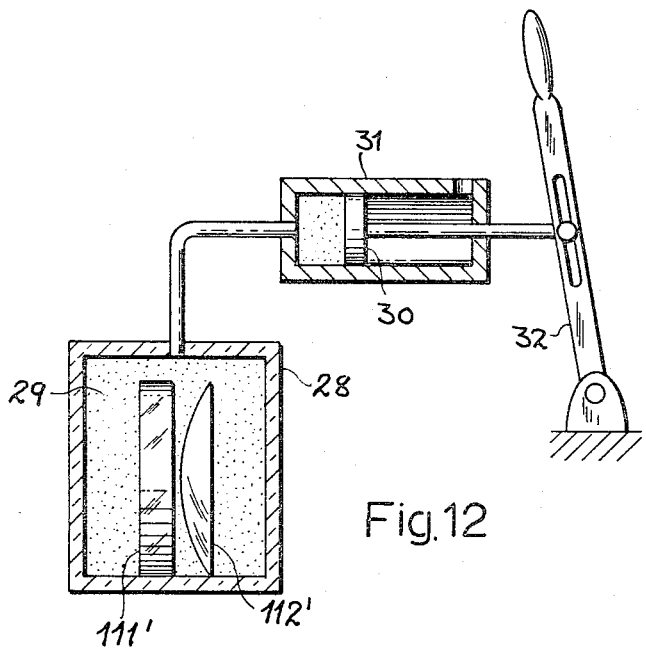
Fig. 12
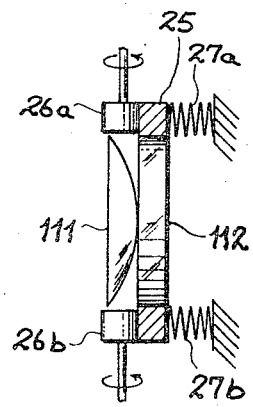
Fig. 9
ANDRÉ JEAN GIRARD
INVENTOR.
BY Karl F. Ross
AGENT United States Patent Office 3,432,238
Patented Mar. 11, 1969

3,432,238
SPECTROMETRIC APPARATUS OF HIGH RESOLVING POWER
André Jean Girard, Chatillon-sous-Bagneux, France, assignor to Office National d'Etudes et de Recherches Aerospatiales, Chatillon-sous-Bagneux, France, a corporation of France
Continuation-in-part of application Ser. No. 31,690, May 25, 1960. This application Mar. 4, 1965, Ser. No. 437,102
Claims priority, application France, May 27, 1959, 759,826; June 1, 1959, 786,180; Apr. 20, 1960, 824,819; May 11, 1960, 826,874
U.S. Cl. 356—97  14 Claims
Int. Cl. G01j 3/06, 3/14

ABSTRACT OF THE DISCLOSURE

Spectrometric apparatus with input and output gates formed by birefringent or divergently juxtaposed lens pairs giving rise to interference patterns which, when brought to coincidence for monochromatic radiation of predetermined frequency, result in a minimum or maximum transmitted flux; relative rotation or other periodic displacement of the two lens pairs results in an alternating output of maximum amplitude for the critical wavelength.

---

This application is a continuation-in-part of my copending application Ser. No. 31,690, filed May 25, 1960, now Patent No. 3,211,048.

My present invention relates to spectrometric apparatus of high resolving power as originally disclosed in my above-identified copending application and patent.

A spectrometer of the type described and illustrated in my copending application comprises essentially a pair of radiation gates, constituting respectively an input member and an output member for a flux of radiation to be analyzed, and between these gates a dispersive system flanked by a pair of collimators which serve to project an image of the input member upon the output member. A characteristic feature of a radiation gate constituting either of these members is the presence thereon of a pattern of zones of alternately a first and a second type of radiation transmissivity, these zones being of progressively varying widths so that the pattern is nonrepetitive at least in the direction of spectrum spread of the dispersive system. The image of the input pattern projected upon the geometrically similar output pattern will accurately register with the latter only for a particular monochromatic radiation, e.g., visible light of a specific color, whose wavelength (hereinafter termed the "adjustment wavelength") depends upon the setting of the dispersive system; thus, it is only this monochromatic radiation for which the throughput of the spectrometer will be either a maximum or a minimum, depending on whether the two patterns are optically identical or complementary. Any departure from the adjustment wavelength is signaled by a sharp drop or rise in throughput, i.e., in the ratio of radiant energy passed by the output member to radiant energy incident upon the input member. The presence or absence of radiation of a selected adjustment wavelength in the band of incident radiant energy is best determined by a comparison of the output obtained under conditions of maximum throughput (i.e., with optically identical patterns) with that obtained under conditions of minimum throughput (i.e., with optically complementary patterns), several arrangements being disclosed in my prior application wherein comparison is facilitated by the provision of alternate ray paths via two mutually complementary input or output gates, or by way of a single gate at each end but with one of these gates having its two sets of zones arranged to transmit radiation in two different directions.

An important object of my present invention is to enable such comparison with but a single ray path including only one input member and one output member.

It is another object of this invention to provide a spectrometric apparatus which utilizes a simplified radiation gate at each end.

The present invention realizes the aforestated objects through the use of radiation-transmissive optical elements which are so constituted and positioned as to split throughgoing radiation into two flux components whose phase relationship varies progressively in a direction transverse to the flux path, thus giving rise to a pattern of alternately cophasal and antiphasal zones (i.e., zones wherein the two flux components are in phase or in phase opposition with each other) which may properly be termed a pattern of Newtonian fringes or Newtonian rings in the specific instance of circularly symmetrical elements. The interference pattern so produced at the input member or gate, when projected upon a geometrically identical pattern produced in like manner at the output member or gate, will have the aforedescribed effect of maximum or minimum throughput when the two patterns are in exact registry. I therefore provide means for at least shifting and, preferably, reversing the effective phase relationship of the two flux components as observed beyond the output member, such reversal being tantamount to a replacement of either the input pattern or the output pattern by its complement whereby the throughput will shift from its maximum to its minimum value or vice versa. A periodic reversal, consequently, will lead to a rapid alternation in the magnitude of the output energy recover from the apparatus, thus rapid alternation being readily detected with the air of an alternating-current circuit suitably tuned to a frequency harmonically related to or, more specifically, identical with the rate of reversal. As a disalignment of the two patterns (resulting from a shift in the wavelength of the incident radiation or from a readjustment of the dispersive system) will tend to obliterate the difference in throughput for different phase relationships of the two flux components, the absence of radiatnt energy carried on the adjustment wavelength will register as a sharp drop in the amplitude of the alternating current fed to the detector stage of the associated indicator system.

The generation of a pattern of Newtonian fringes, as hereinabove defined, may be accomplished in a variety of ways. These include the close juxtaposition of two lenses with confronting surfaces progressively diverging from each other to produce the classical interference pattern; in such a case the first flux component is that fraction of the incident radiation which passes through the two lenses without reflection whereas the second component is the fraction undergoing double reflection at the gap so that its path is lengthened by twice the spacing of the two confronting lens surfaces. Hence, as is well known, the two fractions are in phase opposition and cancel at any location where the separation of the lens surfaces equals a quarter-wavelength or an odd multiple thereof. To introduce the desired phase reversal between the two components, means may be provided for relatively displacing the two lenses in axial direction by a distance of a quarter-wavelength whereby the bright and the dark zones of the interference patterns will interchange their positions. A mechanism for axially vibrating either or both elements of a lens pair with an oscillatory amplitude of one quarter-wavelength (at the selected radiation frequency) may thus be provided at either the input gate or the output gate; in principle, of course, it would also be possible to impart a partial relative displacement to the lenses of one gate and a supplemental relative displacement to the lenses of the other gate. Alternately or additionally, the pressure and, therefore, the density of a surrounding fluid medium may be varied to bring about the desired shift in the phase relationship of the two fluxes.

Another possibility of producing a pattern of Newtonian fringes resides in the use of lenses of birefringent material traversed by plane-polarized radiation. If the input member includes a lens of this type having a uniaxis inclined at approximately 45° with reference to the plane of polarization, as determined by a conventional polarizer positioned ahead of that member, the incident radiation will be split into an ordinary and an extraordinary ray which are polarized at right angles to each other and constitute the two aforedescribed flux components. These two rays, as is well known, will travel at different speeds of propagation through the birefringent material and will therefore emerge from that material with a phase relationship depending upon the thickness of the lens. If this thickness varies progressively in a direction transverse to the ray path, there will thus be created again a pattern of zones which may be described as latent Newtonian fringes since they will be apparent not by direct visual inspection, in contradistinction to the interference pattern previously mentioned (assuming that the radiation lies within the visible spectrum), but only when viewed through another polarizer, usually referred to as an analyzer, also having its plane of polarization inclined at substantially 45° to the uniaxis of the birefringent lens material. If, in accordance with a more specific feature of this invention, the input and output members each include at least one birefringent lens element so shaped that the phase shift occurring in one element is compensated in the other element for radiation passing in a predetermined direction parallel to a reference axis or plane, the ordinary and extraordinary rays will emerge from the last birefringent lens with their original phase relationship so that the vector sum of the two rays will be independent of the distance of the point of emergence from the axis or axial plane of the spherically or cylindrically curved lens. With such an arrangement the analyzer will see virtually the same type of radiation as if the intervening lens elements were omitted. Relative rotation of the two polarizers about an axis parallel to the direction of flux propagation will, therefore, alternately pass and block the radiation transmitted by the input polarizer so that, as in the case of the interference patterns previously described, a marked contrast in throughput will be observable when the planes of the two polarizers coincide or stand at right angles to each other. A similar situation would exist, however, if the lenses were so dimensioned that, for the adjustment wavelength, the emerging ordinary and extraordinary rays were in substantial phase opposition; in that case the throughput would be at a maximum when the planes of the two polarizers are mutually perpendicular. This is true because the analyzer or output polarizer, upon rotating through 90° with reference to the input polarizer, effectively shifts the relative phase of the two flux components represented by the ordinary and the extraordinary ray. Again, as in the case previously discussed, the difference between the extreme values of the throughput sharply diminishes when the incident radiation departs from the adjustment wavelength so that the two latent Newtonian patterns are no longer in exact coincidence.

The selectivity of the apparatus can be further increased, pursuant to still another feature of my invention, by constituting each radiation gate as a pair of birefringent lenses of inversely varying thickness, cemented together with their uniaxes disposed at right angles to each other, the combined thickness of the cemented lenses being constant so that the overall path length through the two pairs will be constant for each ray at any distance from the lens axes (a term intended to include axial planes in the case of cylindrical lenses) within the spectrum-spread plane of the dispersive system besides being the same for both the ordinary and the extraordinary ray, under the assumed condition of coincidence which exists only in the case of the adjustment wavelength, whereby the emerging rays will be invariably in phase and will give rise to the aforedescribed peaks and troughs in throughput when one or the other polarizer is rotated. In an advantageous embodiment, each pair of cemented lenses is bounded by planar and parallel outer surfaces.

The foregoing and other features of my invention will become more fully apparent from the following detained description of certain embodiments, reference being made to the accompanying drawing in which.

Figure 1:
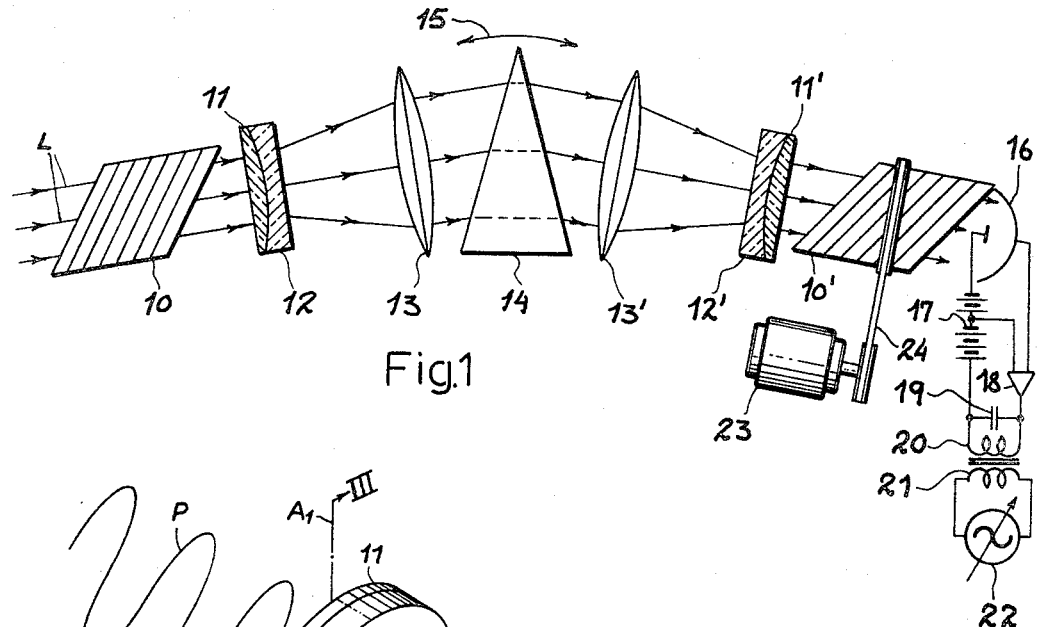
FIG. 1 is a diagrammatic overall view of a spectrometric apparatus embodying my invention.
Figure 2:
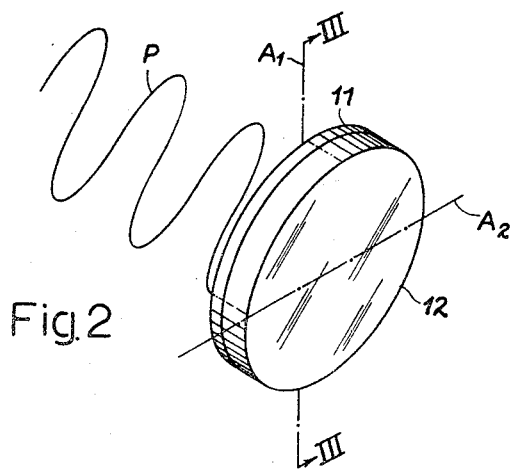
FIG. 2 is a perspective view of a radiation gate used as an input member in the apparatus of FIG. 1.
Figure 3:
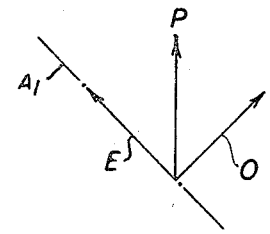
Figure 4:
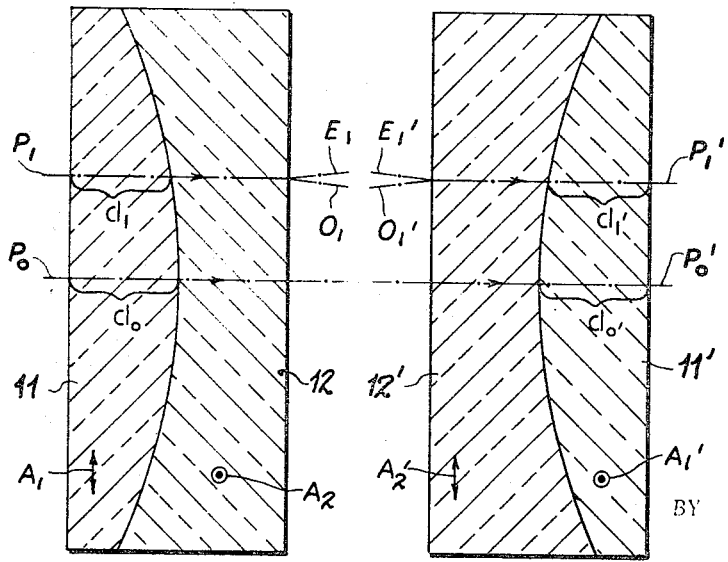
Figure 14:
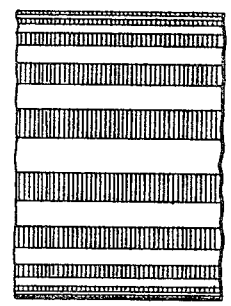

FIG. 3. is a vector diagram relating to FIG. 2;

FIG. 4 is an enlarged cross-sectional view of the input and output members of the apparatus of FIG. 1;

FIGS. 5 and 6 show, in graphs (a) to (e) thereof, the luminous field appearing in the output of the apparatus of FIG. 1 with different settings of its dispersive system and for two orthogonally related positions of its analyzer, respectively;

FIG. 7 is a graph illustrating the signal given by the indicator stage of the apparatus of FIG. 1 as a function of wavelength;

FIG. 8 is a diagrammatic representation of a modified apparatus embodying the invention;

FIG. 9 illustrates a vibratory radiation gate forming part of the apparatus of FIG. 8;

FIGS. 10 and 11 are diagrams of Newtonian rings as produced with the radiation gate of FIG. 9 in different positions thereof;

FIG. 12 shows a modified radiation gate adapted to be used in the spectrometer of FIG. 8;

FIG. 13 is a diagram similar to FIGS. 10 and 11, showing a ring pattern obtainable with the radiation gate of FIG. 12; and FIG. 14 is a diagram, analogous to that of FIG. 10, as obtained with cylindrical lenses.

Reference will first be made to the spectrometric apparatus shown in FIG. 1. This apparatus is disposed to receive incident light rays L from a source of radiation, not shown, and comprises the following units positioned in the path of these light rays: an input polarizer 10 with a fixed plane of polarization, here assumed for convenience to be the plane of the paper; an input gate consisting of a pair of cemented lenses 11, 12 of respectively plano-convex and plano-concave configuration, more fully described hereinafter with reference to FIGS. 2 and 3; an input collimator shown schematically as a collective lens 13; a dispersive system schematically represented by a prism 14, this prism being swingable about a transverse axis, as indicated by arrow 15, in a plane which fortuitously but not necessarily coincides with the plane of polarization of polarizer 10; an output collimator 13' and an output gate 12', 11' identical in construction with collimator 13 and gate 11, 12 and positioned mirror-symmetrically with reference thereto; an output polarizer, or analyzer, 10' mounted for rotation about an axis parallel to its own plane of polarization and to the plane of rotation of prism 14, the plane of polarization of units 10 and 10' being parallel in a reference position of the analyzer; and a radiation receiver in the form of a photoelectric cell 16, the latter being energized from a source of current 17 (indicated schematically as a battery) and working into an amplifier 18 whose output circuit includes a capacitance 19 and an inductance 20 which constitutes the primary winding of a transformer whose secondary winding 21 feeds an alternating-current meter 22. Rotation of analyzer 10' is effected by a mechanism including a motor 23 and a transmission schematically indicated at 24. The reactances 19, 20 are so chosen that the output circuit of amplifier 18 is tuned to a frequency harmonically related to the rotary speed of analyzer 10′, advantageously to a frequency equal to double the number of revolutions per second performed by the analyzer.

The construction of input gate 11, 12 and of the physically identical output gate 11′, 12′ will now be described with reference to FIGS. 2–4; in practice, each of these gates will be in the form of a thin blade. Lenses 11, 12 of the input gate and 11′, 12′ of the output gate consist of identical birefringent material with their uniaxes $A_1$, $A_2$ and $A_1'$, $A_2'$ disposed at an angle of 45° with reference to the plane of polarization of unit 10, as best seen in FIG. 2 where the light waves arriving from the input polarizer have been shown diagrammatically at P. FIG. 3 illustrates how the vector of the polarized light P is split by the lens 11 into two flux components, one of these components being the ordinary ray O at right angles to the optic axis $A_1$ whereas the other component is the extraordinary ray E in line with that axis. As the vector P bisects the right angle between vectors E and O, the magnitude of these latter vectors are regarded as equal.

FIG. 4 shows a central ray $P_0$ which travels along the geometrical axis of lens 11, 12 and, after traversing the projecting and dispersing system 13, 14, 13′ of FIG. 1 (not shown in FIG. 4), forms the ray $P_0'$ coinciding with the geometrical axis of lenses 11′ and 12′, this relationship being true only for monochromatic radiation corresponding to the adjustment wavelength of prism 14. This figure also shows another incident ray $P_1$ whose component rays $O_1$ and $E_1$ diverge slightly at the interface of lenses 11, 12 (such divergence being considered negligible in view of the small lens thickness), and to a somewhat greater extent at the plane face of lens 12, but which are subsequently recombined by the collimators, as shown at $O_1'$ and $E_1'$, to constitute the outgoing ray $P_1'$.

It will be noted that the point of entrance of ray $P_1$ at the plane face of lens 11 has the same distance from the geometrical lens axis as the point of emergence of ray $P_1'$ at the plane face of lens 11′. Owing to the well-known properties of birefringent materials, such as the one which constitutes the lenses 11, 12 and 11′, 12′, the rate of propagation of the ordinary ray O through each of these lenses will differ from that of the extraordinary ray E. If, for example, the lenses consist of negative birefringent material, such as calcite, their refractive index for radiation polarized transversely to their uniaxis will exceed that for radiation polarized parallel thereto. Thus, the ordinary ray O as established by the first lens element 11 will travel more slowly than its companion ray E through lens 11, and also through the lens 12′ whose uniaxis $A_2'$ is parallel to axis $A_1$, but will exceed the propagation speed of ray E upon passing through the other two lenses 12 and 11′ whose optic axes $A_2$, $A_1'$ are at right angles to axes $A_1$, $A_2'$.

Let us consider, for the moment, only the lenses 11 and 11′, assuming that the lenses 12 and 12′ were omitted or made of isotropic material. Since the thickness of lens 11, at any given distance from its geometrical axis represented in FIG. 4 by the ray $P_0$, is exactly equal to the thickness of its counterpart 11′ at a corresponding location, a plane-polarized ray traveling along that axis or arriving parallel thereto, such as the rays $P_0$ and $P_1$, will traverse a distance $d_0$ or $d_1$ in birefringent material having its uniaxis inclined at a certain angle to its plane of polarization (i.e., 90° in the case of ray $O_1$ and 0° in the case of ray $E_1$) and will then pass over a like distance $d_0'$ or $d_1'$ within an identical medium wherein the angle included between the uniaxis and its plane of polarization is complementary to the previous one (0° and 90°, respectively). Thus, the phase of the ordinary ray O will lag behind that of the extraordinary ray E in lens 11 and will shift back into its original relationship in lens 11′. The ordinary and extraordinary rays split off from the incident radiation $E_0$, $E_1$, etc. will, accordingly, recombine again in phase at the distal face of lens 11′ so that any object disposed beyond the analyzer 10′ will be illuminated with maximum brightness. This has been illustrated in FIG. 5(a).

Any change in the wavelength of the incident radiation, or in the angular position of the interposed prism 14 (FIG. 1), will be equivalent to a disalignment of the two gates 11, 12 and 11′, 12′ so that the relative phase shift between the two flux components is no longer exactly compensated. At a certain distance from the geometrical axis, the residual phase shift beyond lens 11′ will amount to half a wavelength so that a pair of dark transverse stripes begin to appear on opposite sides of the lens axis shown in FIG. 5(b). In reality, of course, the transition between light and dark regions will be more gradual than has been illustrated by way of simplification. Upon a further frequency shift, the spacing between the two transverse stripes decreases as illustrated in FIG. 5(c). Still later, as seen in FIG. 5(d), there will be locations distant from the lens axis for which the residual phase shift amounts to a full wavelength so that a pair of bright stripes make their appearance. With larger deviations from the adjustment wavelength (or a greater displacement of the prism 14 or equivalent dispersion means) there will be produced the symmetrical pattern of FIG. 5(e) composed of a multiplicity of alternately dark and bright stripes.

FIG. 5 applies to the situation in which the analyzer 10′ has its plane of polarization parallel to that of input polarizer 10; it is only then that the coaxially emerging ordinary and extraordinary rays will again have the vector relationship shown in FIG. 3 so as to recombine in a polarized ray, similar to ray P, which can be passed by the analyzer. If the latter is rotated through 90°, these rays will be blocked so that the luminous field seen by the detector 16–22 will be dark, as shown in FIG. 6(a), if the incident radiation is of a frequency corresponding to the adjustment wavelength. As will be apparent from FIG. 3, any reversal of the phase of ray E with reference to that of ray O will produce a resultant ray with a plane of polarization perpendicular to vector P; this ray will therefore pass the analyzer 10′ in its new position, hence bright stripes will now appear on an otherwise dark background at the locations of the dark stripes of FIG. 5(b) as illustrated in FIG. 6(b). Here again, the transition between these stripes will be more gradual than has been illustrated. For any given wavelength, the luminous field of the output of analyzer 10′ will now be a pattern complementary to that described in conjunction with FIGS. 5(c), 5(d) and 5(e) as illustrated in FIGS. 6(c), 6(d) and 6(e), respectively.

A comparison of corresponding graphs of FIGS. 5 and 6 reveals that the contrast in overall luminosity is a maximum in the case of FIGS. 5(a) and 6(a) and approaches zero in the situation depicted in FIGS. 5(e) and 6(e). Upon rotation of the analyzer 10′, therefore, the photocell 16 receives peaks and troughs of luminous energy giving rise to a corresponding alternating current in the output of amplifier 18, the amplitude of this current being a maximum for the adjustment wavelength and decreasing toward zero upon departure of the flux from that wavelength. This has been illustrated diagrammatically in FIG. 7 where the wattage $w$ of the output current, as measured by the meter 22, has been plotted against the frequency $\lambda$ of the incident radiation. It will be noted that this wattage, and therefore the signal given off by the meter or equivalent indicating device, reaches a maximum W at the adjustment wavelength $\lambda_0$; the curve has a horizontal tangent in point W, indicative of the progressive changeover from a dark to a light field or vice versa, and exhibits some secondary peaks, of alternate polarity and progressively decreasing magnitude, on both sides of that point. The signal peak in the region of wavelength $\lambda_0$ has been schematically shown as generally triangular with steep flanks, representing a highly selective response.

The negative peaks, while not distinguished as to polarity by the meter 22, are characterized by phase reversals of the alternating current induced in transformer secondary 21.

The presence of the birefringent lenses 12 and 12' does not alter the basic mode of operation described above since they, too, introduce complementary phase shifts by virtue of their geometrically identical cross-sections and the orthogonal relationship of their respective uniaxis $A_2$ and $A_2'$.

Reference will now be made to FIG. 8 which shows a modified spectrometric apparatus according to the invention, comprising an input gate composed of isotropic lens elements 11 and 112, a mirror-symmetrical output gate composed of isotropic lens elements 112' and 111' and an interposed projecting and dispersing system comprising a prism 114 flanked by collimators 113 and 113'. Lenses 111 and 111' are plano-convex and closely juxtaposed with transparencies 112, 112' having the form of flat plates or blades with parallel faces. The curvatures of lenses 111 and 111' have been exaggerated for clarity's sake.

As is well known, a pair of elements 111, 112 or 111', 112' with diverging confronting surfaces form a pattern of Newtonian rings as illustrated in FIGS. 10 and 11, but again with a more gradual changeover. The pattern of FIG. 10 is valid whenever the spacing of these lens elements at the center is zero or equals an even number of quarter-wavelengths; that of FIG. 11 applies when their minimum distance is a quarter-wavelength or an odd multiple thereof. As shown in FIG. 9, means for alternating between the patterns of FIGS. 10 and 11 may be provided in the form of a mounting ring 25, surrounding the element 112, which is displaceable in axial direction by a pair of synchronized cams 26a, 26b against the force of springs 27a, 27b tending to maintain the elements 111, 112 in contact with each other, the displacement stroke of the cams 26a, 26b amounting to a quarter-wavelength or to an odd multiple thereof. It will be understood that this showing is strictly diagrammatical and that various mechanisms known per se may be used for imparting the desired axial oscillation to the lens elements 112 and/or 111; naturally, such mechanisms could also be provided at the output gate 111', 112' rather than at the input gate 111, 112.

When both gates 111, 112 and 111', 112' exhibit the identical pattern, either that of FIG. 10 or that of FIG. 11, all the luminous energy traversing the first gate will also pass through the second gate if the patterns are properly projected upon one another as will be true in the case of the adjustment wavelength; the throughput of the apparatus, as previously defined, will then be at a maximum. When one of these patterns is changed into its complement by the vibratory mechanism shown in FIG. 9, this throughput drops to zero. If, however, the patterns are relatively displaced, the throughput will be less than its maximum in the first case and greater than zero in the second case so that the difference between the two conditions will progressively decrease with departure from the adjustment wavelength. The output of the apparatus of FIG. 8 may again be diagrammatically represented by the graph of FIG. 7.

The annular patterns of FIGS. 10 and 11 are also representative of the latent Newtonian rings produced by the lens pairs 11, 12 and 11', 12' of FIG. 4 as observed when either of these pairs is placed between the two polarizers 10, 10' of FIG. 1. It may be mentioned that the pattern of FIG. 10 will come into existence, for radiation of any frequency, if the axial thickness of lens 11 (or 11') equals that of lens 12 (or 12'), as shown; if these thicknesses differ so as to produce a phase shift of half a wavelength (or an odd multiple thereof) for a particular incident radiation, the latent pattern will resemble that of FIG. 11. Similar patterns will also be obtained from the individual lenses 11, 11', 12 and 12' when these are viewed in the aforedescribed manner.

FIG. 12 shows the lens elements 111', 112' disposed in an airtight enclosure which holds a surrounding gaseous medium 29 adapted to be periodically placed under varying pressure by a piston 30 in a cylinder 31, the piston being driven by a crank mechanism 32. With air and other fluids, a change in pressure results in a variation of their optical density and index of refraction so that this mechanism will also result in a relative phase shift between the two flux components which gave rise to the Newtonian pattern. If, for example, the change in optical density were sufficient to introduce a 25% retardation in the propagation speed of a ray reflected twice within the gap between lens elements 111' and 112', and if the minimum spacing of these elements were one wavelength, the aforesaid retardation would reverse the relative phase of the interfering components in the region of the lens axis and would bring about similar reversals at every other one of the surrounding bright rings, thus producing a pattern as shown in FIG. 13. It will be apparent that the projection of the pattern of FIG. 10 upon that of FIG. 13, or vice versa, will result not in a complete blocking of the transmitted radiation but only in a partial interception thereof so that the throughput under these conditions will drop to about half its maximum. Even in this case, however, a distinct peak in the signal shown in FIG. 7 will exist at the reference frequency corresponding to wavelength $\lambda_0$.

Although it has been assumed in the preceding description that the convex and concave surfaces of the various lens elements of of spherical curvature, these surfaces may also be curved cylindrically with the cylinder axis at right angles to the spectrum-spread plane in which the prism 14 of FIG. 1 or the prism 114 of FIG. 8 is swingable. FIG. 14 shows a pattern of Newtonian fringes, visible or latent, replacing the pattern of FIG. 10 in such case. The operation of the apparatus will be fundamentally the same as has been discussed above.

I claim:

1. In an apparatus for the spectrometric analysis of a flux of radiation, in combination, an input member, an input collimator, a dispersive system, an output collimator and an output member successively positioned in the path of a flux to be analyzed; said input and output members including radiation-transmissive optical elements so positioned to split radiation passing therethrough into two flux components whose relative phase varies progressively in a direction transverse to the flux path whereby an interference pattern of alternately cophasal and antiphasal zones of progressively varying width in at least the spectrum-spread plane of said dispersive system is produced by each of said members; and means including said collimators for projecting an image of the pattern of said input member upon the pattern of said output member in exact coincidence therewith for monochromatic radiation of a wavelength determined by the setting of said dispersive system.

2. In an apparatus for the spectrometric analysis of a flux of radiation, in combination, an input member, an input collimator, a dispersive system, an output collimator and an output member successively positioned in the path of a flux to be analyzed; said input and output members respectively including a first and a second pair of juxtaposed radiation-transmissive optical elements positioned to split radiation passing therethrough into two flux components whose relative phase varies progressively from a reference location outwardly in a direction transverse to the flux path, at least one element of each pair varying progressively in thickness on opposite sides of a reference location in at least the spectrum-spread plane of said dispersive system whereby a pattern of Newtonian fringes centered on said reference location is produced by each of said pairs; and means including said collimators for projecting an image of the pattern of said first pair upon the pattern of said second pair in exact coincidence therewith for monochromatic radiation of a wavelength determined by the setting of said dispersive system.

3. An apparatus for the spectrometric analysis of a flux of radiation, comprising an input member, an input collimator, a dispersive system, an output collimator and an output member successively positioned in the path of a flux to be analyzed; said input and output members including radiation-transmissive optical elements positioned to split radiation passing therethrough into two flux components whose relative phase varies progressively in a direction transverse to the flux path whereby a pattern of alternately cophasal and antiphasal zones of progressively varying width in at least the spectrum-spread plane of said dispersive system is produced by each of said members; means including said collimators for projecting an image of the pattern of said input member upon the pattern of said output member in exact coincidence therewith for monochromatic radiation of a wavelength determined by the setting of said dispersive system; mechanism for shifting the effective phase relationship of said flux components beyond said output member with resulting alternation of the throughput of said monochromatic radiation between a maximum and a minimum value; and indicator means positioned to receive the radiation passed by said output member for registering the extent of said alternation.

4. An apparatus as defined in claim 3 wherein said elements includes a first lens forming part of said input member and a second lens forming part of said output member, said lenses consisting of optically identical birefringent material and being so shaped that the ordinary and extraordinary rays therethrough, representing said two flux components, have the same combined path length through said members at any distance from the lens axes within said spectrum-spread plane, said input member further comprising first polarizer means in the path of the incident radiation ahead of said first lens, said output member further comprising second polarizer means between said second lens and said indicator means, one of said polarizer means having a fixed plane of polarization, said lenses having uniaxes inclined at substantially 45° with reference to said plane of polarization, the other of said polarizer means being rotatable in a plane transverse to said spectrum-spread plane under the control of said mechanism.

5. An apparatus as defined in claim 3 wherein said dispersive system is swingable in said spectrum-spread plane.

6. An apparatus for the spectometric analysis of a flux of radiation, comprising an input member, an input collimator, a dispersive system, an output collimator and an output member successively positioned in the path of a flux to be analyzed; said input and output members including radiation-transmissive optical elements positioned to split radiation passing therethrough into two flux components whose relative phase varies progressively in a direction transverse to the flux path whereby a pattern of alternately cophasal and anitphasal zones of progressively varying width in at least the spectrum-spread plane of said dispersive system is produced by each of said members; means including said collimators for projecting an image of the pattern of said input member upon the pattern of said output member in exact coincidence therewith for monochromatic radiation of a wavelength determined by the setting of said dispersive system; mechanism for periodically shifting the effective phase relationship of said flux components observable beyond said output member with resulting alternation of the throughput of said monochromatic radiation between a maximum and a minimum value; photoelectric transducer means positioned to receive the radiation passed by said output member, and transducer means being provided with an output circuit tuned to a frequency related to the rate of phase shift; and current-responsive detector means connected to be energized from said output circuit for registering the extent of said alternation.

7. An apparatus for the spectrometric analysis of a flux of radiation, comprising an input member, an input collimator, a dispersive system, an output collimator and an output member successively positioned in the path of a flux to be analyzed; said input and output members respectively including a first and a second pair of juxtaposed radiation-transmissive optical elements positioned to split radiation passing therethrough into two flux components whose relative phase varies progressively from a reference location outwardly in a direction transverse to the flux path, at least one element of each pair varying progressively in thickness on opposite sides of a reference location in at least the spectrum-spread plane of said dispersive system whereby a pattern of Newtonian fringes centered on said reference location is produced by each of said pairs; means including said collimators for projecting an image of the pattern of said first pair upon the pattern of said second pair in exact coincidence therewith for monochromatic radiation of a wavelength determined by the setting of said dispersive system; mechanism for shifting the effective phase relationship of said flux components observable beyond said output member with resulting alternation of the throughput of said monochromatic radiation between a maximum and a minimum value; and indicator means positioned to receive the radiation passed by said output member for registering the extent of said alternation.

8. An apparatus as defined in claim 7 wherein each of said pairs is composed of two complementary lenses of inversely varying individual thickness and constant combined thickness cemented together, said lenses consisting of optically identical birefringent material with mutually perpendicular uniaxes within said pair and being so shaped that the ordinary and extraordinary rays therethrough, representing said two flux components, have the same combined path length through said pairs at any distance from the lens axes within said spectrum-spread plane, said input member further comprising first polarizer means in the path of the incident radiation ahead of said first pair, said output member further comprising second polarizer means between said second pair and said indicator means, one of said polarized means having a fixed plane of polarization inclined at substantially 45° with reference to the uniaxes of said lenses, the other of said polarizer means being rotatable in a plane transverse to said spectrum-spread plane under the control of said mechanism.

9. An apparatus as defined in claim 8 wherein each pair of cemented lenses are bounded by parallel planar surfaces.

10. An apparatus as defined in claim 7 wherein the elements of each pair are lenses with closely spaced confronting surfaces progressively diverging from each other in said spectrum-spread plane.

11. An apparatus as defined in claim 10 wherein the lenses of at least one pair are mounted for relative displacement in axial direction, said mechanism being coupled with the lenses so mounted for effecting said displacement.

12. An apparatus as defined in claim 10 wherein the lenses of at least one pair are provided with an enclosure confining them within a fluid having a pressure-sensitive index of refraction, said mechanism comprising means connected with said enclosure for varying the pressure of said fluid.

13. An apparatus as defined in claim 7 wherein said first and second pairs are mirror-symmetrical counterparts of each other.

14. An apparatus for the spectrometric analysis of a flux of radiation, comprising an input member, an input collimator, a dispersive system, an output collimator and an output member successively positioned in the path of a flux to be analyzed; said input and output members respectively including a first and a second pair of juxtaposed radiation-transmissive optical elements positioned to split radiation passing therethrough into two flux components whose relative phase varies progressively from a reference location outwardly in a direction transverse to the flux path, at least one element of each pair varying progressively in thickness on opposite sides of a reference location in at least the spectrum-spread plane of said dispersive system whereby a pattern of Newtonian fringes centered on said reference location is produced by each of said pairs; means including said collimators for projecting an image of the pattern of said first pair upon the pattern of said second pair in exact coincidence therewith for monochromatic radiation of a wavelength determined by the setting of said dispersive system; mechanism for periodically reversing the effective phase relationship of said flux components observable beyond said output member with resulting alternation of the throughput of said monochromatic radiation between a maximum and a minimum value; photoelectric transducer means positioned to receive the radiation passed by said output member, said transducer means being provided with an output circuit tuned to a frequency related to the rate of phase reversal; and current-responsive detector means connected to be energized from said output circuit for registering the extent of said alternation.

References Cited

UNITED STATES PATENTS

| | | | |
|---|---|---|---|
| 2,976,764 | 3/1961 | Hyde et al. | 88—14 |
| 3,004,465 | 10/1961 | White | 88—14 |
| 3,034,398 | 5/1962 | Barnes | 88—14 |

FOREIGN PATENTS 1,249,247  7/1961  France.

OTHER REFERENCES

Girard: "Nouveaux Dispositifs de Spectroscopie à Grande Luminosité," Optica Acta, v. 7, No. 1, January 1960, pp. 87–97 relied on.

Jenkins et al.: Fundamentals of Optics, second edition, McGraw-Hill Book Company Inc., 1950, pp. 260–262 relied on.

JEWELL H. PEDERSEN, *Primary Examiner.*

F. L. EVANS, *Assistant Examiner.*

U.S. Cl. X.R.

350—179, 212, 204, 175; 356—99, 71, 106, 116